United States Patent [19]
Hahn et al.

[11] 4,140,728
[45] Feb. 20, 1979

[54] HEAT HARDENABLE POWDER COATINGS BASED ON POLYESTER RESINS CONTAINING CARBOXYL GROUPS

[75] Inventors: Siegfried Hahn, Siegburg-Kaldauen; Günter Tews; Helmut Wulff, both of Witten, all of Fed. Rep. of Germany

[73] Assignee: Dynamit Nobel Aktiengesellschaft, Troisdorf Bez. Cologne, Fed. Rep. of Germany

[21] Appl. No.: 794,331

[22] Filed: May 5, 1977

[30] Foreign Application Priority Data
May 15, 1976 [DE] Fed. Rep. of Germany ....... 2621656

[51] Int. Cl.² .............................................. C08L 63/00
[52] U.S. Cl. ................................ 260/835; 260/37 EP; 260/40 R; 427/27; 427/195; 428/418; 428/458

[58] Field of Search ................... 260/835, 429.3, 429.5, 260/75 R, 47 EA; 427/27, 195; 252/431 R

[56] References Cited
U.S. PATENT DOCUMENTS

| | | | |
|---|---|---|---|
| 2,920,089 | 1/1960 | Samour | 260/429.5 |
| 2,946,756 | 7/1960 | Wheelock et al. | 260/2 |
| 3,966,836 | 6/1976 | de Clear et al. | 260/835 |

*Primary Examiner*—Theodore E. Pertilla
*Attorney, Agent, or Firm*—Sprung, Felfe, Horn, Lynch & Kramer

[57] ABSTRACT

A heat hardenable powder coating composition comprising a carboxyl group containing polyester resin and a polyepoxide compound and a catalyst said catalyst being a titanium and/or zirconium chelate which is solid at room temperature.

18 Claims, No Drawings

HEAT HARDENABLE POWDER COATINGS BASED ON POLYESTER RESINS CONTAINING CARBOXYL GROUPS

BACKGROUND OF THE INVENTION

1. Field Of The Invention

This invention relates to thermosetting coating compositions in powder form. More particularly this invention relates to heat hardenable powdered coating compositions comprising carboxyl group containing polyesters, polyepoxide compounds and cross-linking catalyst where the cross-linking catalyst is a titanium or zirconium chelate which is solid at room temperature. The heat hardenable powdered coating composition of the present invention can also include conventional pigments and fillers as well as additives and a adjuvants such as leveling agents and the like.

2. Discussion Of The Prior Art

Thermosetting coating compositions are known from German Offenlegungsschrift No. 21 63 962, which contain the components named above. The polyester resins containing carboxyl groups described therein are prepared with difficulty by a multi-step process. Compounds are described as polyepoxide compounds which contain at least two epoxide groups, such as, for example, diglycidylterephthalate, triglycidylisocyanurate or polyglycidyl ethers of 0-cresol-formaldehyde novolacs. In this case tris-(2,4,6-dimethylaminomethyl)-phenol (DMP) is used as catalyst. There are difficulties involved, however, in incorporating the liquid DMP into powdered varnish compositions, using, for example, a Rhön wheel mixer. The preparation of "master batches," as they are called, is also difficult. If DMP is added to a melt of the polyester resin, the latter becomes considerably discolored.

German Offenlegungsschrift 23 28 012 relates to coating substances in powder form composed of polyesters containing free carboxyl groups or succinic acid, and cross-linking agents which react with carboxyl groups at elevated temperatures. The acid polyesters claimed therein are prepared by the reaction of hydroxyl-group-containing polyesters with succinic acid anhydride, in mixture, if desired, with other dicarboxylic acid anhydrides.

In addition to the previously mentioned solid polyepoxides made from bisphenol A and epichlorhydrin, the cross-linking agents named are various glycidyl esters of di-, tri- and tetracarboxylic acids as well as glycidyl derivatives of hydantoin and/or polyoxazolines. The catalysts that can be added are, for example, tertiary amines and their salts such as benzyldimethylamine, metal salts of organic acids such as tin octoate or bismuth salicylate, or also imidazoles.

The catalytic activity of the compounds named differs considerably, and, especially in the case of the use of polyepoxide resins made from bisphenol A and epichlorhydrin, they are unsatisfactory. At low setting temperatures below 200° C., insufficiently cross-linked films are obtained; higher temperatures than 200° C. are uneconomical, and also the varnish films can discolor. Where these substances are liquid, the disadvantages are the same as they are with DMP.

SUMMARY OF THE INVENTION

In accordance with the present invention there is provided an improved heat hardenable powder coating composition comprising a carboxyl group containing polyester, a polyepoxide compound and a catalytic amount of a catalyst, said catalyst being a zirconium and/or titanium chelate which is solid at room temperature. The zirconium and/or titanium chelate functions as a cross-linking catalyst for the cross-linking of the carboxyl group containing polyester resins with the polyepoxide compounds.

Preferred are those chelates whose melting range does not exceed the maximum temperature during the homogenization of the powdered varnish components performed, for example, in an extruding machine. Neither, of course, can any reaction of the components take place in such a manner as to interfere with the formation of the film in the thermosetting operation that follows. Particularly suitable chelates are those which melt between about 35° C. and about 100° C.

DESCRIPTION OF SPECIFIC EMBODIMENTS

The subject of the invention is therefore coating substances in powder form which are hardenable by heating, containing:

1. Carboxyl-group-containing polyester resins
2. Polyepoxide compounds
3. Catalysts
4. Conventional pigments and fillers as desired
5. Conventional additives and adjuvants, such as leveling agents and the like, characterized in that they contain as catalysts titanium and/or zirconium chelates which are solid at room temperature.

The carboxyl-group-containing polyester resins contained in the powdered coating substances of the invention are prepared by polycondensation from polybasic carboxylic acids or their esterifiable derivatives and from polyvalent alcohols by polycondensation in a known manner, preferably by condensation in the melt, the starting substances being transesterified with one another or esterified in the presence, if desired, of conventional catalysts.

Examples of polybasic aromatic, cycloaliphatic or aliphatic carboxylic acids are terephthalic acid or its dimethyl esters, isophthalic acid, phthalic acid or its anhydride, trimellitic acid and pyromellitic acid or their anhydrides, tetrahydrophthalic acid, hexahydrophthalic acid or their anhydrides, adipic acid, azelaic acid and sebacic acid.

To a lesser extent, monobasic carboxylic acids can also be used, such as for example benzoic acid or its methyl ester, p-toluylic acid, p-tert.-butylbenzoic acid, 2-ethylhexanic acid or isononanic acid. Allowance must be made in this case for the fact that relatively large amounts of aliphatic carboxylic acids reduce the softening point of the polyester in a known manner.

Examples of suitable polyvalent alcohols are pentaerythritol, trimethylolethane, trimethylolpropane, glycerine, tris-hydroxyethylisocyanurate, ethylene glycol, propanediol-1,2, neopentylglycol (2,2-dimethylpropanediol-1,3), butanediol-1,3, butanediol-1,4, hexanediol-1,6, cyclohexanedimethanol (1,4-dihydroxymethylcyclohexane), ethoxylated bisphenol A (2,2-bis-[4,4'-hydroxyethoxyphenyl]-propane), hydrogenated bisphenol A (2,2-bis-[4,4'-hydroxycyclohexyl]-propane). Here, again, monovalent alchols can be used concomitantly to a secondary degree, if desired, such as, for example, benzyl alcohol or 2-ethylhexanol, if the choice of the other raw materials allows it or makes it necessary.

The molar ratio of the raw materials is selected in a known manner such as to assure a sufficient excess of the COOH-group-containing components over the OH-group-containing components, so that polyester resins containing mostly free carboxyl groups will be obtained, having acid numbers between about 40 and about 100 [mg KOH/g], preferably between 50 and 75 [mg KOH/g]. The hydroxyl number in this case can be between 0 and 15 [mg KOH/g].

The acid polyester resins prepared by the methods of German Offenlegungsschrift Nos. 2 163 962 and 2 328 012 or in any other way can be used in accordance with the present invention.

The acid polyester resins contained in the powdered coating agents of the invention are colorless to yellowish solids which are brittle and easy to grind at room temperature and whose softening point is preferably in the temperature range between about 70° and about 105° C., as measured in accordance with DIN 53 180.

Polyepoxide compounds in the meaning of the invention are substances which are solid and grindable at room temperature, and which contain at least two epoxide groups per molecule, such as, for example, the solid bis-glycidyl ethers based on 4,4'-dioxydiphenyl-2,2-propane (bisphenol A) and 1,2-epoxy-3-chloropropane (epichlorhydrin), the epoxy resins, polyglycidyl ethers of phenyl-formaldehyde or cresol-formaldehyde novolacs, triglycidyl isocyanurate, the diglycidyl esters of the isomeric phthalic acids, the triglycidyl ester of trimellitic acid, and the tetraglycidyl ester of pyromellitic acid. The use of the commercially available epoxy resins on a basis of bisphenol-A, the diglycidyl ester of terephthalic acid, and triglycidyl isocyanurate, is preferred.

The chelates to be used as the catalysts in accordance with the invention are derived from one or more branched 1,3-diols as chelating agents, with the concomitant use, in some cases, of one or more other diols and/or monovalent alcohols. They correspond to the general formula

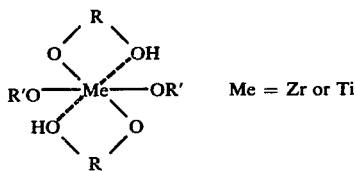

Me = Zr or Ti wherein R is a propylene moiety which is substituted asymmetrically by at least one alkyl group. The alkyl substituents can be identical or different, straight-chained and/or branched. They can contain, for example, as many as 10 carbon atoms. R' is hydrogen, alkyl or hydroxyalkyl of up to 10 carbon atoms, cycloalkyl or hydroxycycloalkyl, or aralkyl or hydroxyaralkyl.

Where R' is a cycloalkyl or hydroxycycloalkyl group it preferably has five or six carbocyclic carbon atoms. Where R' is an aralkyl or hydroxyaralkyl group there are six to eighteen carbocyclic carbon atoms in the aryl moiety and between 1 and 9 carbon atoms in the alkyl moiety. Preferably the aryl portion of the aralkyl moiety is a phenyl group.

Such chelates of titanium are described, for example, Houben-Weyl, "Methoden der organischen Chemie", 4th ed., Vol. VI/2, page 33. Their preparation is performed simply by the reaction of alcoholates of titanium and low monovalent alcohols, such as for example, titanium-n-butyl or tetraisopropyl titanate, with 2 to 4 moles of the branched 1,3-diols used as chelating agents in accordance with the invention per mole of titanium alcoholate at elevated temperature, followed by the removal of the released monovalent alcohol by distillation. Preferably, the alcoholates are titanium or zirconium alcoholates derived from $C_1$ to $C_5$ mono-alkanols especially $C_3$ to $C_4$ alkanols.

1,3-Diols suitable for the preparation of solid titanium chelates are, for example, those having 2 to 3 alkyl substituents, such as, for example, 2,2,4-trimethylpentanediol-1,3, 2-methylpentanediol-2,4, 2-ethylhexanediol-1,3, 2-methylpentanediol-1,3 and 2-methyl-5-propyl-heptanediol-1,3, alone, or mixtures of the individual components. The concomitant use of other suitable diols or diol mixtures such as, for example, ethylene glycol, butanediol-1,4, hexanediol-1,6, cyclohexanedimethanol-1,4, bis-(2-hydroxyethoxy)-diphenylolpropane, or p-xylylene glycol, mixed, in some cases, with suitable monovalent alcohols such as, for example, 2-ethylhexanol and/or benzyl alcohol, is also possible. 2,2,4-trimethylpentanediol-1,3 is especially suitable as a chelating agent and therefore is used preferentially as such, alone or together with cyclohexanedimethanol-1,4 or bis-(2-hydroxyethoxy)-diphenylolpropane or hexanediol-1,6 or butanediol-1,4. In this case it is desirable first to mix the 1,3-diols used for the chelation with the titanium alcoholates, and then, after the exothermic reaction has ended, to add the other diols if desired. The monovalent alcohols that are released are distilled out by heating the reaction mixtures, it being desirable to complete such distillation in vacuo.

The zirconium chelates which are to be used similarly in accordance with the invention are prepared in the same manner as the titanium chelates described above. Their properties such as consistency and reactivity, however, differ from those of analogous titanium chelates. Their use is advantageous especially when it is desired to reliably prevent the yellowing of the varnish films by (accidental) overcuring at high temperatures.

For the catalysis of the condensation reaction of components 1 and 2 in the powdered coating substance, from 0.5 to 2 wt.-% of the titanium and/or zirconium chelates, for example, are required.

The pigments (component 4) which are contained, if desired, in the coating substances of the invention, are preferably titanium dioxide pigments of the rutile type, preferably treated with aluminum and silicon compounds, which are conventionally used in powder varnishes. Suitable colored pigments can also be used in order to obtain a desired shade of color.

Conventional fillers are, for example, finely divided silica gels, which can be used to control the gloss of the varnish films.

The conventional additives and adjuvants (component 5) especially include suitable leveling agents. Commercially available ones are Acronal® 700 L, Acronal® 4 F, Modaflow® Powder, and BYK® Powder Flow. Of these, usually 1 to 2 wt.-% are usually required, with respect to the powder.

The compositions obtained from components 1 to 5 by mixing and homogenization in heated kneaders or extruding machines at suitable temperatures, of up to 120° C. for example, are finely ground in suitable mills and sifted. The weight ratio of components 1 and 2 can be between 25:75 and 75:25, according to the characteristics required in the coatings. Preferred is a ratio of 50:50 parts by weight.

The powdered coating substances in accordance with the invention which are thus prepared are applied to the substrates to be coated in a known manner, preferably electrostatically. By the application of heat for about 30 to 15 minutes at a substrate temperature of 175° to 200° C., glossy, elastic films are obtained which are resistant to solvents and have outstanding resistance to weathering.

In order to more fully illustrate the nature of the invention and the manner of practicing the same the following examples are presented.

EXAMPLES

The invention will be further explained by the following examples.

Examples of the Preparation of the Polyester Resins

EXAMPLE 1: POLYESTER RESIN A 174 w-p (weight-parts) of trimethylolpropane, 1798 w-p of neopentyl glycol, 2289 w-p of dimethylterephthalate, 1.4 w-p of tetrabutyl titanate, and 1,4 w-p of zinc acetate dihydrate are heated with stirring and the introduction of inert gas until methanol begins to distil. The temperature of the reaction mixture is gradually increased to 230° C. in accordance with the rate of distillation, and is maintained at that level until at least 95% of the calculated amount of methanol has been distilled out through a packed column and no more methanol is passing over. After the transesterification product has been cooled to 180° C., 250 w-p of adipic acid is added and the mixture is condensed with a raising of the product temperature to 200° C. until about 50% of the calculated amount of water has passed over. 1195 w-p of isophthalic acid is added and condensed with a raising of the product temperature to 235° C. until the following characteristics have been obtained: reduced viscosity, measured in a mixture of 60 w-p of phenol and 40 w-p of tetrachloroethane, 0.25; acid number 46 [mg KOH/g]; hydroxyl number 5 [mg KOH/g]; softening point per DIN 53,180, 97° to 100° C.

EXAMPLE 2: POLYESTER RESIN B 162 w-p of trimethylolpropane, 474 w-p of 2,2-bis-(4,4'-hydroxyethoxyphenyl)-propane (ethoxylated bisphenol A), 1266 w-p of neopentyl glycol, 1746 w-p of dimethylterephthalate, 1.05 w-p of tetrabutyl titanate and 1.05 w-p of zinc acetate dihydrate are transesterified as described in Example 1; at 200° C., 498 w-p of isophthalic acid is added and the mixture is condensed with raising of the product temperature to 245° C. until the following characteristics are achieved: acid number 69 [mg KOH/g]; hydroxyl number 3 [mg KOH/g]; reduced viscosity 0.17; softening point 96° C.

EXAMPLE 3: POLYESTER RESIN C 48 w-p of trimethylol propane, 392 w-p of ethylene glycol and 592 w-p of phthalic acid anhydride are esterified with a slow increase of the product temperature to 220° C., until an acid number below 15 is reached. After this has cooled to 200° C., 548 w-p of isophthalic acid is added and the mixture is condensed with temperature increase to 245° C. until a reduced viscosity of 0.28 is reached. The characteristics of the product are: acid number 53 [mg KOH/g], hydroxyl number 4 [mg KOH/g], softening point 79°–81° C.

EXAMPLE 4: POLYESTER RESIN D 391 w-p of ethylene glycol and 49 w-p of pentaerythritol are transesterified with 776 w-p of dimethylterephthalate and 49 w-p of benzoic acid methyl ester in the presence of 0.5 w-p of tetrabutyl titanate and 0.5 w-p of zinc acetate dihydrate, as described in Example 1, and condensed with 548 w-p of isophthalic acid to a reduced viscosity of 0.26, acid number 57 [mg KOH/g], hydroxyl number 13 [mg KOH/g], softening point 101°–103° C.

EXAMPLES OF THE PREPARATION OF THE TITANIUM AND ZIRCONIUM CHELATES TO BE USED IN ACCORDANCE WITH THE INVENTION

EXAMPLE 5

584 w-p (4 moles) of 2-ethylhexanediol-1,3 is added, with stirring, to 568 w-p (2 moles) of tetraisopropyltitanate and, after the exothermic reaction has ceased, 576 w-p (4 moles) of cyclohexanedimethanol-1,4 is added. The temperature of the reaction mixture is gradually raised to 160° C. while the isopropanol that is released is distilled out through a packed column, under a vacuum of about 150 mbar at the end.

After cooling, a solid, white, crystalline mass is obtained having a melting range of 40°–56° C. in accordance with DIN 53,181; the titanium dioxide content, calculated at 12.80%, is found to be 12.75%.

EXAMPLE 6

766 w-p (2 moles) of tetrabutyl zirconate is heated with stirring at 70° C., and 584 w-p (4 moles) of 2,2,4-trimethylpentanediol-1,3 is added; after 15 minutes, 1264 w-p (4 moles) of bis-(2-hydroxyethoxy)-diphenylpropane (ethoxylated bisphenol A) is added and the butanol that is released is distilled off at a temperature increasing up to 140° C., a vacuum of about 150 mbar being applied at the end. The product has a waxy cloudiness after cooling, and upon heating at 50°–60° C. it crystallizes within a few hours. Melting range per DIN 53,181: 77°–91° C., $ZrO_2$ content: calculated 12.2%, found 10.8%.

Examples of additional chelates are given in Table 1.

Table 1

| Example No. | Composition in moles | Melting Range DIN 53,181 °C | $MeO_2$ Calc. | $MeO_2$ Found |
|---|---|---|---|---|
| 7 | 1 Isopr. tit. 2 EHD 2 p-XG | 72 – 85 | 13.1 | 13.0 |
| 8 | 1 Bu-tit. 2 EHD 2 EG | 53 – 73 | 17.3 | 17.2 |
| 9 | 1 Bu-tit. 2 EHD 2 BD-1,4 | 35 – 57 | 15.5 | 15.1 |
| 10 | 1 Isopr.-tit. 2 EHD 2 HD-1,6 | 35 – 44 | 14.0 | 13.7 |
| 11 | 1 Bu-Zirc. 4 TMPD | 35 – 42 | 18.3 | 16.0 |
| 12 | 1 Bu-tit. 2 TMPD 2 CHDM | 72 – 79 | 12.8 | 12.6 |
| 13 | 1 Bu-tit. 2 TMPD 2 DIANOL | 88 – 99 | 8.3 | 8.3 |

Glossary
Isopr.-tit.     Tetraisopropyl titanate
Bu-tit.         Tetrabutyl titanate
Bu-Zirc.        Tetrabutyl zirconate Table 1-continued

| Example No. | Composition in moles | Melting Range DIN 53,181 ° C | MeO₂ Calc. | Found |
|---|---|---|---|---|
| EHD | 2-Ethylhexyanediol-1,3 | | | |
| TMPD | 2,2,4-Trimethylpentanediol-1,3 | | | |
| EG | Ethylene glycol | | | |
| BD-1,4 | Butanediol-1,4 | | | |
| HD-1,6 | Hexanediol-1,6 | | | |
| DIANOL | Bis-(2-hydroxyethoxy)-diphenylolpropane | | | |
| p-XG | p-xylylene glycol | | | |
| CHDM | Cyclohexanedimethanol | | | |

Examples of the Preparation of the Powdered Coating Substances of the Invention

The weight-parts listed in Table 2 for the carboxyl-group-containing polyester resins (component 1), polyepoxide compounds (component 2), catalysts (component 3), pigments and fillers (component 4) and additives and adjuvants (component 5) are worked in a known manner by mixing, extruding, grinding and sifting to form coating substances in powder form having a grain size under 100 microns and mostly between 30 and 60 microns.

The powdered coating substances are applied by means of the known electrostatic powder spraying process, at a voltage of 80 kV, onto degreased steel plates 0.8 mm thick, which have been lapped on both sides, and were baked on under the conditions specified in Table 2. The varnish films obtained have a thickness of 50 to 60 microns; they are fully cross-linked, i.e., resistant to methyl ethyl ketone (MEK), well leveled, and they adhere tightly to the substrate. The cupping test and gloss values are contained in Table 2.

| Example No. | 14 | 15 | 16 | 17 | 18 | 19 | 20 |
|---|---|---|---|---|---|---|---|
| Polyester resin (1) | 600 A | 600 B | 500 C | 600 A | 525 D | 660 A | 1000 A |
| Epoxy compound (2) | 600<sup>a)</sup> | 600<sup>a)</sup> | 500<sup>b)</sup> | 600<sup>c)</sup> | 525<sup>c)</sup> | 400<sup>d)</sup> | 100<sup>d)</sup> |
| Catalyst (3) | 35 | 15 | 25 | 35 | 30 | 30 | 35 |
| from Example No. | 12 | 13 | 7 | 6 | 11 | 5 | 8 |
| Pigment (4) TiO₂ CL 220 | 640 | 628 | 523 | 640 | 558 | 600 | 594 |
| Filler (blanc fixe) | — | — | — | — | — | 300 | — |
| Leveling agent | 19<sup>x)</sup> | 19<sup>x)</sup> | 16<sup>x)</sup> | 19<sup>y)</sup> | 17<sup>y)</sup> | 20<sup>z)</sup> | 18<sup>y)</sup> |
| Curing conditions, minutes/° C | 15/200 | 11/200 | 15/200 | 25/200 | 15/200 | 15/200 | 30/175 |
| Erichsen cupping test DIN 53,156, in mm | 8.4 | 9 | 10 | 8 | 7 | 8 | 4 |
| Gloss according to Lange | 116 | 128 | 124 | 125 | 114 | 98 | 112 |

<sup>a)</sup>Epikote<sup>(R)</sup> 1004
<sup>b)</sup>Epikote<sup>(R)</sup> 1055
<sup>(c)</sup>Araldit 7004
<sup>d)</sup>Triglycidyl isocyanurate
<sup>x)</sup>BYK Powder Flow
<sup>y)</sup>BYK 352
<sup>z)</sup>Acronal 700 L Examples Given for Purposes of Comparison 1. If 896 w-p of the polyester resin A from Example 1 is mixed with 384 w-p of Epikote 1004 epoxy resin, 700 w-p of CL 220 titanium dioxide and 20 w-p of BYK Powder Flow without the addition of the catalysts of the invention to a powdered coating substance in the manner described, the varnish film heated for 15 minutes at 200° C. is not cross-linked, i.e., it can be washed off with MEK, and has no elasticity whatever.

2. If 1000 w-p of polyester resin A together with 135 w-p of diglycidyl terephthalate, 502 w-p of titanium dioxide and 34 w-p of Acronal 700 L are made into varnish films in the same manner, without the addition of the catalysts of the invention, the films are not cross-linked and they are inelastic. If 20 w-p of DABCO diaza-bicyclooctane is added as catalyst, an only partially cross-linked, greatly yellowed varnish film of insufficient elasticity is obtained after 15 minutes at 200° C.

What is claimed is:

1. A heat hardenable powder coating composition comprising a carboxy group containing polyester resin having an acid number between about 40 and about 100 mg KOH/g and a softening point of 70°–105° C., a 1,2-polyepoxide compound which is solid at room temperature and has at least 2 epoxide groups per molecule and a catalytic amount of a catalyst, said catalyst being a titanium or zirconium chelate which is solid at room temperature, said chelate having the formula

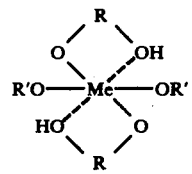

wherein
R is a propylene moiety which is substituted asymetrically by at least one alkyl group,
R' is hydrogen, alkyl or hydroxyalkyl of up to 10 carbon atoms, cycloalkyl or hydroxycycloalkyl, or aralkyl or hydroxyaralkyl and
Me is zirconium or titanium.

2. A composition according to claim 1 wherein the chelate is the reaction product of a titanium or zirconium alcoholate with 2 to 4 moles of a branched 1,3-diol.

3. A composition according to claim 2 wherein said diol is a diol having 2 to 3 alkyl substituents.

4. A composition according to claim 3 wherein said diol was selected from the group consisting of 2,2,4-trimethylpentanediol-1,3, 2-methylpentanediol-2,4, 2-ethylhexanediol-1,3, 2-methylpentanediol-1,3, 2-methyl-5-propylheptanediol-1,3 and mixtures thereof.

5. A composition according to claim 3 wherein said 1,3-diol is in admixture with another diol.

6. A composition according to claim 5 wherein said other diol is selected from the group consisting of ethyleneglycol, butanediol-1,4, hexanediol-1,6, cyclohexanedimethanol-1,4, bis-(2-hydroxyethoxy)-diphenylolpropane and p-xylylene glycol.

7. A composition according to claim 5 wherein said other diol is in admixture with a monoalcohol.

8. A composition according to claim 7 wherein said monoalcohol is selected from the group consisting of 2-ethylhexanol and benzyl alcohol.

9. A composition according to claim 3 wherein the 1,3-diol is 2,2,4-trimethylpentanediol-1,3 and the same is in admixture with cyclohexanedimethanol-1,4, bis-(2-hydroxyethoxy)-diphenylolpropane, hexanediol-1,6 or butanediol-1,4.

10. A composition according to claim 1 containing a pigment, filler or mixture thereof.

11. A composition according to claim 1 containing and additive, adjuvant or mixture thereof.

12. A composition according to claim 1 wherein the polyepoxide compound is one selected from the group consisting of solid bis-glycidyl ethers based on 4,4'-dioxyphenyl-2,2-propane or 1,2-epoxy-3-chloropropane, the epoxy resins, polyglycidylethers of phenyl-formaldehyde or cresol-formaldehyde novolacs, triglycidyl isocyanurate, the diglycidyl esters of the isomeric phthalic acids, the triglycidyl ester of trimellitic acid and the tetraglycidyl ester of pyromellitic acid.

13. A composition according to claim 1 wherein the carboxyl group containing polyester resin is one derived from the condensation of a polybasic aromatic, cycloaliphatic or aralphatic carboxylic acid with a polyvalent alcohol.

14. A composition according to claim 1 wherein the carboxyl group containing polyester resin is one obtained by the condensation of terephthalic acid, terephthalic acid dimethyl ester, isophthalic acid, phthalic acid, phthalic acid anhydride, trimellitic acid, trimellitic acid anhydride, pyromellitic acid, pyromellitic acid anhydride, tetrahydrophthalic acid, hexahydrophthalic acid, tetrahydrophthalic acid anhydride, hexahydrophthalic acid anhydride, adipic acid, azelaic acid or sebacic acid with a polyvalent alcohol selected from the group consisting of pentaerythritol, trimehylolethane, trimethylolpropane, glycerine, tris-hydroxyethylisocyanurate, ethylene glycol, propanediol-1,2, neopentylglycol, butanediol-1,3, butanediol-1,4, hexanediol-1,6, cyclohexanedimethanol, ethoxylated bisphenol A, and hydrogenated bisphenol A.

15. A composition according to claim 1 wherein the carboxyl group containing polyester and polyepoxide compound are present in a weight ratio to one another between 25:75 and 75:25.

16. A composition according to claim 17 wherein the carboxyl group containing polyester and polyepoxide compounds are present in a ratio of 50:50 parts by weight.

17. A composition according to claim 1 wherein the titanium or zirconium chelate is present in an amount of from 0.5 to 2% by weight.

18. A heat hardenable powder coating composition according to claim 1 wherein a mixture of titanium and zirconium chelates is employed as catalyst.

* * * * *